United States Patent [19]

Williams, Jr.

[11] Patent Number: 5,234,753
[45] Date of Patent: Aug. 10, 1993

[54] SOIL RELEASE COMPOSITION FOR USE WITH POLYESTER TEXTILES

[75] Inventor: William A. Williams, Jr., Latrobe, Pa.

[73] Assignee: PPG Industries, Inc., Pittsburgh, Pa.

[21] Appl. No.: 954,595

[22] Filed: Sep. 30, 1992

Related U.S. Application Data

[63] Continuation of Ser. No. 681,285, Apr. 8, 1991, abandoned.

[51] Int. Cl.$^5$ ............ B32B 27/02; B32B 27/18; B32B 33/00; D06M 15/507
[52] U.S. Cl. ............ 428/265; 8/115.6; 252/8.9; 428/272; 428/395
[58] Field of Search ............ 8/115.6; 252/8.9; 428/265, 272, 395

[56] References Cited

U.S. PATENT DOCUMENTS

| | | | |
|---|---|---|---|
| 3,416,952 | 12/1968 | McIntyre et al. | 428/482 |
| 3,557,039 | 1/1971 | McIntyre et al. | 524/605 |
| 3,935,281 | 1/1976 | Cottman | 524/585 |
| 4,069,160 | 1/1978 | Hawkins | 252/8.9 |
| 4,787,989 | 11/1988 | Fanelli et al. | 252/8.6 |
| 4,999,128 | 3/1991 | Sonenstein | 252/174.14 |

*Primary Examiner*—James C. Cannon
*Attorney, Agent, or Firm*—Edward J. Whitfield; Irwin M. Stein

[57] ABSTRACT

Disclosed is a soil release composition for application to or finishing on polyester textile that is heat set at a temperature of 375° F. (191° C.) or higher, said composition comprising a non fiber forming polyester-polyether copolymer and an antioxidantly effective amount of the butylated reaction product of dicyclopentadiene with p-cresol.

18 Claims, 1 Drawing Sheet

SOIL RELEASE COMPOSITION FOR USE WITH POLYESTER TEXTILES

This application is a continuation of application Ser. No. 07/681,285, filed Apr. 8, 1991, and now abandoned.

BACKGROUND OF THE INVENTION

Synthetic polymeric textiles, e.g., polyester textiles, are commonly used in a wide variety of consumer and industrial applications. One disadvantage of polyester textiles is the difficulty in removing oily residues, i.e., naphthenic, aliphatic or alkane hydrocarbon residues, such as motor oil, tar, pitch, lubricating oil or the like, from the material once it has been soiled with such residues. This is in part due to the hydrophobic nature of the polyester textile which makes the material difficult to wet with aqueous laundering materials.

As a result, soil release compositions have been developed for application to polyester textiles. These soil release compositions, which are typically comprised of non-fiber forming polyether-polyester copolymers, modify the polyester textile surface to enable release and removal of oily residues from the polyester textile using conventional laundry techniques. Typical polymeric soil release compositions are described, e.g., in U.S. Pat. No. 3,416,952.

To impart anti-wrinkle properties and to control dimensional stability, e.g., shrinkage, of polyester textiles, the same are thermally treated or heat set. Heat setting aligns the crystal morphology of the polyester fibers to a more parallel rather than random orientation. In modern polyester textile processing mills, heat setting is typically effected at a temperature of at least about 375° F. (about 191° C.) to speed throughput and to better control fabric shrinkage. Such temperatures may range up to about 405° F. (about 207° C.) or so. Since the soil release composition is applied to the polyester textile prior to heat setting, an antioxidant material may be included in the soil release composition to retard or prevent its thermal degradation during the heat setting step.

As disclosed in the above mentioned U.S. Pat. No. 3,416,952, antioxidant materials typically used to impart thermal stability to the polymeric soil release compositions described therein include sterically hindered phenols, aromatic amines or organic sulfur compounds. However, none of the antioxidant materials specifically disclosed therein satisfactorily retard or prevent thermal degradation of the polymeric soil release composition at polyester textile heat set temperatures of about 375° F. (191° C.) or higher. As a result polyester textiles finished with such soil release compositions and heat set at such elevated temperatures have unsatisfactory soil release properties resulting in incomplete removal of oily residues from the textile when using conventional laundering techniques.

DESCRIPTION OF THE INVENTION

Figure 1:
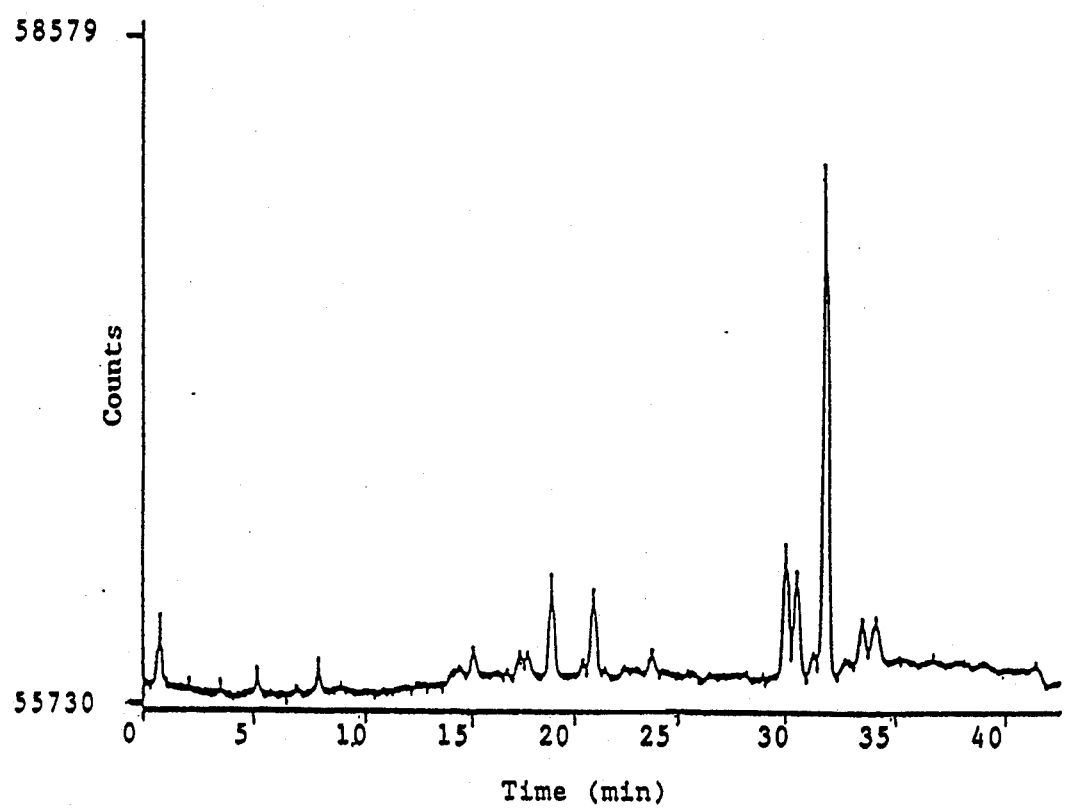
FIG. 1 is a high performance liquid chromatographic (HPLC) tracing of a sample of antioxidant material used in the soil release composition of the invention.

This invention provides a thermally stable soil release composition for application to polyester textiles, particularly to polyester textiles that are heat set at temperatures of at least about 375° F. (191° C.) The soil release composition of the invention when applied to or finished on polyester textile prior to heat setting is not only durable at such heat set temperatures but also enables release and removal of oily residue from the polyester textile without staining or discoloration when using conventional laundering techniques. The term heat set as used herein is intended to mean the thermal treatment of polyester textile, typically at a temperature in the range of from about 375° F. (191° C.) to about 405° F. (207° C.) so as to align the crystalline morphology of the polyester fibers into a more parallel rather than random orientation, thus imparting wrinkle and shrink resistance to the polyester textile. Oily residues as used herein are meant to include naphthenic, aliphatic or alkane hydrocarbons such as motor oil, pitch, tar, or the like. Conventional laundry techniques are those employed to wash and dry fabrics using commercially available detergents and laundry aids with washing and drying apparatus found in the home or commercial laundries.

Generally speaking, the soil release composition of the invention comprises a non-fiber forming polyester-polyether copolymer and a sterically hindered phenol antioxidant material, the latter of which is the butylated reaction product of p-cresol and dicyclopentadiene.

Non-fiber forming polyester-polyether copolymers, e.g., polyethylene terephthalate - polyoxyethylene terephthalate (PET - POET) copolymers and their use as soil release promoting agents for polyester textiles are well known to the art. Such PET - POET copolymers, typically having an average molecular weight in the range of from about 5,000 to about 50,000, may be prepared, e.g., by the ester interchange and subsequent polymerization of dimethyl terephthalate (DMT) and ethylene glycol (EG) in the presence of a mixed catalyst system as described in U.S. Pat. No. 3,557,039. U.S. Pat. No. 3,959,280 describes a similar mode of preparation using polyethylene oxide in addition to the DMT and EG reactants. Such PET - POET soil release promoting copolymers are commercially available from a number of manufacturers.

The copolymeric material of which the soil release composition of the invention is comprised preferably contains from about 10 to 50% by weight of ethylene terephthalate repeat units together with from about 90 to 50% by weight of polyoxyethylene teraphthalate repeat units which have been derived from a polyoxyethylene glycol having an average molecular weight of from about 1000 to about 4000, and wherein the molar ratio of ethylene terephthalate repeat units to polyoxyethylene terephthalate repeat units is from about 2:1 to about 6:1. A preferred copolymeric material for use in the composition of the invention comprises the reaction product of ethylene glycol, dimethyl terephthalate and a polyoxyethylene glycol containing from 1 to about 50 ethylene oxide repeat units which may be prepared as described, e.g., in Example 11 of U.S. Pat. No. 3,416,952. A particularly preferred copolymeric material of which the soil release composition of the invention is comprised is commercially available from PPG Industries, Inc. under the trademark, "Larosol 214A". This material is available as an aqueous dispersion of the reaction product of ethylene glycol, dimethyl terephthalate and polyoxyethylene glycol, the latter having an average molecular weight of about 1450. Another commercially available PET - POET type polymeric composition particularly suitable for use in the invention is a product sold by ICI America under the trademark, "Milease T". The Milease T material believed to be that prepared according to Example 19 of U.S. Pat. No. 3,416,952 also contains an antioxidant believed to consist of zinc dinonyldithiocarbamate and 2-α-methylcyclohexyl-4,6-dimethylphenol.

The antioxidant material used in the soil release composition of the invention is the butylated reaction product of dicyclopentadiene and p-cresol This antioxidant is a sterically hindered phenol, the field absorption mass spectrum of which is depicted and discussed in Rubber Chem. Technol., Vol. 53(1), pp. 154–155 (1980). This antioxidant material may be prepared in a manner analogous to that described in U.S. Pat. No. 3,935,281, the teachings of which respecting the mode of preparation are incorporated by reference herein. Generally speaking, the antioxidant material may be prepared by reacting dicyclopentadiene with p-cresol in the presence of an inert organic solvent followed by reaction of the product with isobutene in the presence of a suitable alkylation catalyst. The antioxidant material of which the soil release composition of the invention is comprised is also commercially available from The Goodyear Tire & Rubber Co. under the trademark, "Wingstay L".

Further with regard to characterizing the antioxidant material used in the soil release composition of the invention, FIG. 1 is an HPLC tracing of a sample of Lot No. 10218-4 of said commercially available Wingstay L material. As can be seen in the HPLC tracing of FIG. 1, the major component, which is believed to be the active component, elutes at a retention time of about 31.8 minutes, this component having an area % of about 40. (The sharp peak eluting at a retention time of about 33 minutes is, of course, characteristic of the carrier solvent.) Said major component has the empirical formula, $C_{49}H_{64}O_3$ and may be represented by the structural formula:

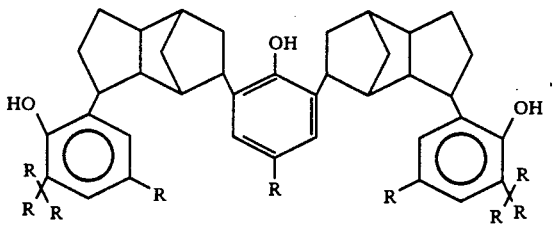

wherein each R represents a methyl group.

The HPLC tracing of FIG. 1 was generated using a Hewlett Packard 1090L high performance liquid chromatograph equipped with a diode array detector and autosampler using a PE Nelson Access Chrome Data System for quantitation. The column was a 4.6 mm × 15 cm Dychrom column packed with Chemcosorb 5-ODS-UH and the guard column was a 2 cm × 2 mm Upchurch column packed with Permaphase ODS. The column temperature was 40° C., the injection volume was 1 microliter and the detector wavelength was 280 nm (bandpass 4 nm) with reference at 550 nm (bandpass 50 nm). Mobile phase program A was water with 0.005% v/v triethylamine and mobile phase program B was acetonitrile with 0.005% v/v triethylamine. The flow rate was 1.5 milliliters per minute.

The effective amount of antioxidant material incorporated in the soil release composition is an antioxidant effective amount, i.e , an amount which provides thermal stability to the copolymeric material at heat set temperatures of at least 375° F. (191° C.) and which does not adversely affect the durability of the copolymeric material. Experimental results indicate that, at a level below about 0.5% by weight based on weight of the polyester - polyether copolymeric material, soil release properties of the treated and heat set polyester textile are less than desirable; whereas at a level much above 2.0% by weight based on weight of copolymeric material, durability of the treated and heat set polyester textile to continued washing cycles is adversely affected. Consequently, the herein described antioxidant material is used most advantageously in the invention composition in antioxidantly effective or thermal stabilizing amount ranging from about 0.5 to about 2.0% by weight, and preferably from about 0.75 to about 1.5% by weight based on the weight of the copolymeric material.

Polyester textiles to which the soil resistant composition of the invention may be applied include dyed or undyed, woven or nonwoven polyester cloth as well as polyester fiber, filament or yarn used to make such cloth, which polyester fiber may also be blended with varying amounts of natural materials, e.g., wool or cotton. The polyesters commonly used as textiles are those fiber forming polyesters which are typically made by reacting a dicarboxylic acid or ester forming derivative thereof with a glycol to form the bis-glycol esters of the acid. The ester is then typically condensed at elevated temperature and reduced pressure to eliminate excess glycol and produce the glycol ester polymer of the dicarboxylic acid. Suitable glycols used in the manufacture of fiber forming polyester include, e.g., ethylene glycol, diethylene glycol, polyethlyene glycol or other alkylene glycols, including mixtures thereof. Of the dicarboxylic acids, terephthalic acid is commonly used in the manufacture of fiber forming polyester although a portion of the terephthalic acid may be replaced by one or more other dicarboxylic acids, such as adipic acid, sebacic acid, isophthalic acid or the like.

In use, the soil release composition of the invention is typically formulated as an aqueous emulsion containing at least about 60% by weight of water and typically from about 70 to about 90% by weight water. Preferably, the aqueous emulsion contains about 85% by weight water and the balance active material, i.e., the antioxidant-containing copolymeric material. The invention composition may be applied to the polyester textile by any conventional technique, e.g., padding, pressure jet, dye vat, or the like. Regardless of the mode of application, sufficient of the invention composition is applied to or finished on the polyester textile so as to provide, from about 0.3 to about 1.5% by weight, and preferably from about 0.5 to about 0.9% by weight of the active soil release composition, i.e., undiluted invention composition, based on the weight of polyester textile undergoing treatment. The soil release composition of the invention is compatible with other typically used polyester textile treatment or conditioning materials such as, e.g., dyes, dye carriers, defoamers, anti-cracking aids, brightening agents, other antioxidant materials, or the like.

The invention is further illustrated but is not intended to limited by the following examples.

EXAMPLE 1

An aqueous dispersion containing about 15% by weight of Larosol 214A copolymeric material comprising the reaction product of ethylene glycol, dimethyl terephthalate and polyoxyethylene glycol, the latter having an average molecular weight of about 1450 was applied to 6"×18" swatches of Dacron type 54 and type 64 100% polyester fabrics, each swatch weighing about 12.5 grams. The copolymeric material was applied to the fabric from an aqueous bath adjusted to pH 4.5 to 5.0 with acetic acid and containing about 1.0% by weight on weight of fabric of Palanil Yellow 3GN dye (DISPERSE YELLOW #64, CI No. 47023), about 2.0% by weight on weight of fabric of perchloroethylene solvent dye carrier and about 4% by weight on weight of fabric of the 15% by weight aqueous dispersion of Larosol 214A copolymeric material using an Atlas Model LHTP Launder-ometer provided with 200 ml capacity, Type 7 stainless steel high pressure specimen containers and using polyethylene glycol as the heat transfer medium. The weight ratio of treatment liquor to fabric was about 10:1, providing about 0.6% by weight of copolymeric material based on weight of fabric. For control purposes the bath contained all additives but for the dye. The fabric swatches and dye bath liquor were charged cold to the specimen containers and sealed. The containers were mounted in the Launder-ometer and the contents were heated to about 265° F. (129° C.) at a temperature rise rate of about 10° F. per minute. After heating for about 30 minutes at 265° F. (129° C.), the bath was cooled to about 120° F. (49° C.), the fabric swatches were removed from the containers, rinsed, tumble dried and lightly pressed. The foregoing procedure was repeated except that Milease T, another commercially available PET - POET type polymeric material was used in place of the Larostat 214A material.

A 6"×6" portion of the fabric swatch was spotted with about 0.1 milliliter of filtered, used crankcase oil, which oil was allowed to wick into the fabric. The fabric swatch was then washed and rinsed in a conventional home washing machine using 90 grams of AATCC standard laundry detergent #124. The oil spotted portion was severed from the swatch and the remaining ⅔ of the swatch was washed four times more and dried. Another 6"×6" portion of the swatch was oil spotted, washed and dried once as before and severed from the swatch. The remaining 6"×6" portion of the swatch was washed five more times and the drying, oil spotting and washing procedure was repeated. The fabric swatches were then visually evaluated for soil release properties and durability, i.e., soil release as a function of the number of washing - drying cycles.

More particularly, the soil release properties of the fabric swatches were evaluated using the following Rating Scale:

| | |
|---|---|
| 1 (Total Failure) | No release of oil and wicking noted in all directions. |
| 2 (Failure) | No or little release of oil, but oil is contained within original boundaries of spot. No initial wicking, but may occur over 72 hrs. |
| 3 (Partial Failure) | Oil release, but not in a uniform manner. Original shape of the spot cannot be determined and the spot can appear stripped due to release bars across the center. |
| 4 (Release) | Oil is released with only a slight shadow remaining from where the spot was at originally. |
| 5 (Total Release) | Oil is completely released with no shadow remaining to indicate the original area of the test spot. |

Table 1 summarizes the results of the test swatches of Dacron 54 an 64 treated in accordance with this Example 1.

TABLE 1

| | No. of Wash-Dry Cycles | | |
|---|---|---|---|
| Product | Initial | 5 | 10 |
| Larostat 214A on Dacron 54 | 5 | 5 | 4+ |
| Larostat 214A on Dacron 64 | 5 | 5 | 4+ |
| Milease T on Dacron 54 | 5 | 4+ | 4+ |
| Milease T on Dacron 64 | 5 | 4+ | 4+ |

The procedure described in Example 1 was repeated except that the fabric swatches were not dyed. No discernible difference was observed in the undyed swatches as compared with the dyed swatches as reported in Table 1.

EXAMPLE 2

The test procedure described in Example 1 was repeated except that the Dacron polyester fabric swatches were undyed and heat set at a temperature of 375° F. (191° C.). None of the tested swatches exhibited acceptable soil release properties, i.e., durability was poor and discoloration progressively worsened as a function of repeat washing cycles. More particularly, using the Rating Scale described in Example 1, the swatches tested in accordance with this Example 2 are as set forth in Table 2, as follows:

TABLE 2

| | No. of Wash-Dry Cycles | | |
|---|---|---|---|
| Product | Initial | 5 | 10 |
| Larosol 214A on Dacron 54 | 2 | 1 | 1 |
| Larosol 214A on Dacron 64 | 1+ | 1 | 1 |
| Milease T on Dacron 54 | 1+ | 1 | 1 |
| Milease T on Dacron 64 | 1+ | 1 | 1 |

EXAMPLE 3

A number of commercially available materials were evaluated to determine their ability to thermally stabilize the copolymeric soil release material, i.e., Larosol 214A, described in Example 1 at a heat set temperature of about 395° F. (202° C.). The materials evaluated were Irganox 1010, Irganox 1035 and Irganox 1076 polymeric sterically hindered phenols (trademarked products of Ciba Geigy); butylated hydroxy toluene (BHT); Cyanox LTDP dilaurylthiodipropionate (trademarked product of American Cyanamid Co.); Plas-Chek 775 epoxidized soybean oil (trademarked product of Ferro, Inc.); and Wingstay L (Lot No. 20726-50) butylated reaction product of p-cresol and dicyclopentadiene (trademarked product of The Goodyear Tire & Rubber Co.). About 1% by weight of each of said materials was added to individual portions of the Larosol 214A copolymer material described in Example 1 prior to preparing the 15% aqueous dispersion of same. The test procedure described in Example 1 was then followed for each test material except that undyed Dacron 54 polyester fabric swatches were heat set at 395° F. (202° C.) for three minutes. Of the samples tested, the polymeric material stabilized with the butylated reaction product of p-cresol and dicyclopentadiene (Wingstay L) afforded the best results as compared to the other tested materials from the standpoints of non-yellowing soil release capability and durability of soil release capability. More particularly, the following Table 3 summarizes the results obtained according to this Example 3, using the Rating Scale described in Example 1.

TABLE 3

| Product | No. of Wash-Dry Cycles | | |
|---|---|---|---|
| | Initial | 5 | 10 |
| Irganox 1010 | 2 | 1 | 1 |
| Irganox 1035 | 1 | 1 | 1 |
| Irganox 1076 | 4+ | 4 | 3 |
| BHT | 5* | 5* | 4* |
| Cyanox LTDP | 1 | 1 | 1 |
| Plas-Chek 775 | 1 | 1 | 1 |
| Wingstay L | 5 | 5 | 4+ |

*denotes extreme yellowing

Other commercially available materials were also evaluated for their ability to thermally stabilize the copolymeric soil release agent described in Example 1, namely Mesitol NBS (trademarked product of Mobay Chemical Co.) and Sunlit TN-8 (trademarked product of Nikka, Inc.) each of which are sulfonated condensation polymers of bisphenol-S with formaldehyde. When applied at the what appeared to be the optimal level of 2% on weight of fabric, these materials were ineffective in preventing thermal degradation of the copolymeric soil release agent of Example 1 at a fabric heat set temperature of 395° F. (202° C.), but did exhibit marginal soil release properties at a heat set temperature of 375° F. (191° C.).

Although the invention has been described in some detail by the foregoing it is to be understood that many variations may be made therein by those skilled in the art without departing from the spirit and scope thereof as defined in the appended claims.

I claim:

1. A composition suitable for application to polyester textile, said composition being thermally stable at 375°-405° F., and which imparts soil release properties to the polyester textile, said composition comprising a non-fiber forming polyether-polyester copolymeric material and a thermal stabilizing amount of an antioxidant material which is the butylated reaction product of p-cresol and dicyclopentadiene.

2. The composition of claim 1 wherein the antioxidant material has an HPLC tracing as shown in FIG. 1 having a major component with the empirical formula, $C_{49}H_{64}O_3$, and represented by the structural formula:

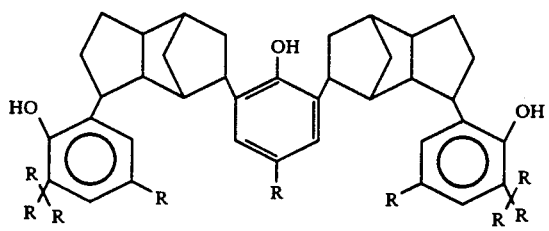

wherein each R is a methyl group.

3. The composition of claim 1 wherein the antioxidant material is present in an amount of from about 0.5 to about 2.0% by weight based on the weight of copolymeric material.

4. The composition of claim 1 wherein the copolymeric material is a polyethylene terephthalate-polyoxyethylene terephthalate copolymer comprising from about 10 to about 50% by weight of ethylene terephthalate repeat units and from about 90 to about 50% by weight of polyoxyethylene terephthalate repeat units derived from polyoxyethylene glycol having an average molecular weight of from about 1000 to about 4000 and wherein the ratio of ethylene terephthalate repeat units to polyoxyethylene terephthalate repeat units is from about 2:1 to about 6:1.

5. The composition of claim 4 wherein the copolymeric material comprises the reaction product of ethylene glycol dimethyl terephthalate and polyoxyethylene glycol containing from 1 to about 50 ethylene oxide repeat units.

6. The composition of claim 4 wherein the antioxidant material is present in an amount of from about 0.5 to about 2.0 percent by weight based on the weight of the copolymeric material.

7. The composition of claim 5 wherein the antioxidant material is present in an amount of from about 0.75 to about 1.5 percent by weight based on the weight of the copolymeric material.

8. The composition of claim 1 wherein the copolymeric material comprises the reaction product of ethylene glycol, dimethyl terephthalate and polyoxyethylene glycol.

9. The composition of claim 8 wherein the antioxidant material is present in an amount of from about 0.5 to about 2.0 percent by weight based on the weight of the copolymeric material.

10. An aqueous emulsion comprising from about 70 to about 90 percent by weight water and the balance the soil release composition of claim 1.

11. An aqueous emulsion comprising from about 70 to about 90 percent by weight water and the balance the soil release composition of claim 6.

12. An aqueous emulsion comprising from about 70 to about 90 percent by weight water and the balance the soil release composition of claim 7.

13. An aqueous emulsion comprising about 85 percent by weight water and the balance the soil release composition of claim 7.

14. Polyester textile having applied to or finished thereon the soil release composition defined in claim 1.

15. The polyester textile of claim 14 wherein the soil release composition is present thereon in an amount of from about 0.3 to about 1.5% by weight based on the weight of polyester textile.

16. The polyester textile of claim 15 wherein the soil release composition is present thereon in an amount of from about 0.5 to about 0.9% by weight based on the weight of polyester textile.

17. Polyester textile having applied to or finished thereon from about 0.3 to about 1.5 percent by weight, based on the weight of the polyester textile, of the soil release composition defined in claim 6.

18. Polyester textile having applied to or finished thereon from about 0.5 to about 0.9 percent by weight, based on the weight of the polyester textile, of the soil release composition defined in claim 7.

* * * * *